United States Patent [19]

Smith

[11] Patent Number: 5,320,465
[45] Date of Patent: Jun. 14, 1994

[54] BLIND PIN FIXING

[75] Inventor: Daniel R. Smith, Sutton Coldfield, United Kingdom

[73] Assignee: Emhart Inc., Newark, Del.

[21] Appl. No.: 17,221

[22] Filed: Feb. 12, 1993

[30] Foreign Application Priority Data

Feb. 15, 1992 [GB] United Kingdom ............... 9203251

[51] Int. Cl.⁵ ............................................. F16B 13/04
[52] U.S. Cl. ....................................... 411/43; 411/57; 411/361
[58] Field of Search ................... 411/361, 43, 70, 49, 411/50, 52, 53, 39, 40, 57, 44

[56] References Cited

U.S. PATENT DOCUMENTS

| | | | |
|---|---|---|---|
| 1,851,292 | 3/1932 | Rasmussen | 411/53 |
| 3,204,517 | 9/1965 | Looker | 411/57 |
| 3,452,638 | 7/1969 | Lauer | 411/70 X |
| 3,650,173 | 3/1972 | Mathe | 411/45 |
| 4,639,175 | 1/1987 | Wollar | 411/43 X |
| 4,759,670 | 7/1988 | Linder et al. | 411/43 |
| 4,865,499 | 9/1989 | Lacey | 411/361 X |
| 4,904,133 | 2/1990 | Wright | 411/43 |
| 4,913,609 | 4/1990 | Mauer | 411/43 |
| 5,085,545 | 2/1992 | Takahashi | 411/49 X |
| 5,106,249 | 4/1992 | Janotik | 411/361 X |

Primary Examiner—Rodney M. Lindsey
Attorney, Agent, or Firm—Edward D. Murphy

[57] ABSTRACT

A blind pin fixing is provided comprising a headed pin having a series of radial grooves in that part of its stem beneath the head and a flanged body with a first circular flange and a deformable body portion projecting therefrom and arranged for the reception of the head of said headed pin so that in operation the deformable body portion is inserted through a hole in a workpiece and the fastener set by drawing the pin from the side of the flange remote from the deformable body portion so that the deformable body portion is collapsed round the hole and the collar and metal flow into the grooves locks the pin to the flanged body, the deformable body portion being of square section and formed with axial slots extending fully to the end remote from the flange so that it is divided into a plurality of, preferably four, legs which facilitate collapsing when the fastener is set. Preferably, a second circular flange is provided, spaced from the deformable body portion, that space between the two flanges providing accommodation for a component to be secured by the blind pin fixing.

4 Claims, 3 Drawing Sheets

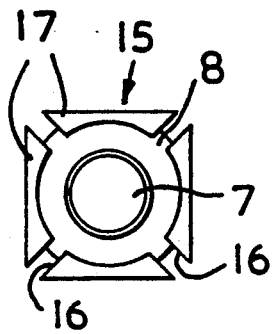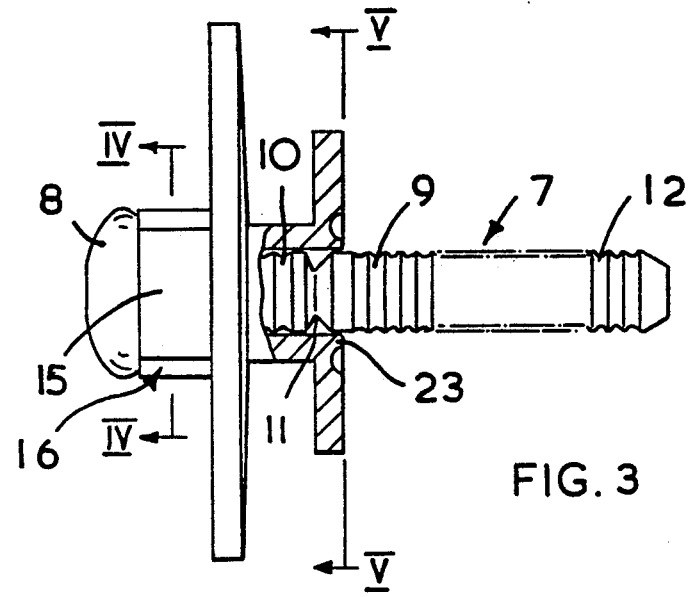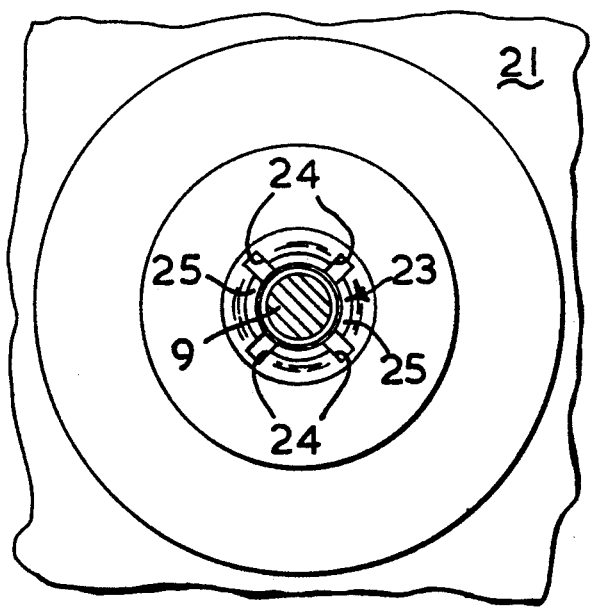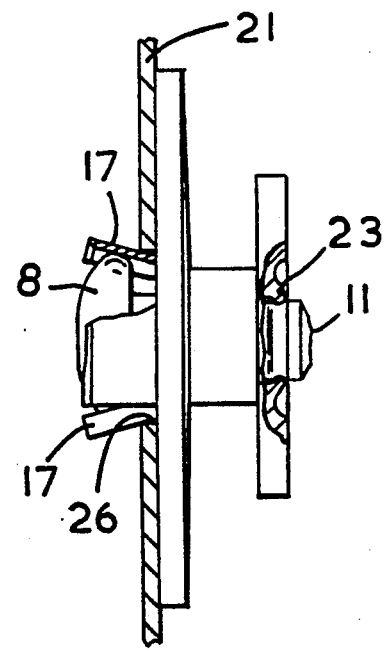
FIG. 4
FIG. 3
FIG. 5
FIG. 6

BLIND PIN FIXING

BACKGROUND OF THE INVENTION

The present invention relates to a fastening device known as a blind pin fixing, being a two-part fastener assembly comprising a body assembled onto a grooved pin. The body features a deformable blind side portion and at the operator side a raised collar integral with the body capable of being locked onto the grooved pin. The workpiece to be secured being retained between the blind side of the body and the head of the grooved pin. The fastener is inserted from one side of the workpiece and the fastener set by pulling on the pin so that the collar on the operator side is locked to the pin by metal flow into the grooves in the pin and the pin broken at a weaker section adjacent the collar. Such a fastener is described in GB 629 098.

It is an object of the present invention to provide a blind pin fixing which can be attached to a sheet such for example a body panel for a car and provide a firm location for a push-on, slotted component.

BRIEF DESCRIPTION OF THE INVENTION

According to the present invention, a blind pin fixing comprises a headed pin having a series of circumferential grooves in that part of its stem beneath the head and a flanged body with a first circular flange and a deformable body portion projecting therefrom and arranged for the reception of the head of said headed pin so that in operation the deformable body portion is inserted through a hole in a workpiece and the fastener assembly set by drawing the pin from the operator side of the flange remote from the deformable body portion so that the deformable body portion is collapsed round the hole and collar is swaged so that the collar material flows into the grooves and locks the pin to the flanged body is characterised in that the deformable body portion is of square section and formed with axial slots extending fully to the end remote from the flange so that it is divided into a plurality (at least three) of 'legs' which facilitate collapsing when the fastener is set.

Preferably the slots are formed in the deformable body portion at the four corners of the square section, so that the deformable body portion is divided into four 'legs'.

Preferably a second circular flange is provided spaced from the first flange on the side remote from the deformable body portion, the space between the two flanges providing accommodation for e.g. a slotted component to be secured by the blind pin fixing. The second flange may be the same size as the first flange but is preferably of smaller diameter.

The pin is formed with a weakened section to provide a breakpoint at a chosen location relative to the head of the pin. A collar is formed on the side of the second flange remote from the first flange and is arranged to collapse and lock into grooves specifically provided on the head side of the broken breakpoint of the pin. In another preferred example, this collar is of round section and it, too, may be provided with slots so that it is divided into segments.

BRIEF DESCRIPTION OF THE DRAWINGS

In order that the invention be better understood it will now be described in greater detail by way of example with reference to the accompanying drawings in which:

FIG. 3 is an axial section of a modified blind pin fixing according to the invention;

FIG. 4 is a cross-section on line IV—IV of FIG. 3;

FIG. 5 is a cross-section on line V—V of FIG. 3; and

FIG. 6 is an axial section showing the modified blind pin fixing of FIG. 3 set in a hole in a metal panel.

DETAILED DESCRIPTION OF EMBODIMENTS AND DRAWINGS

Figure 1:
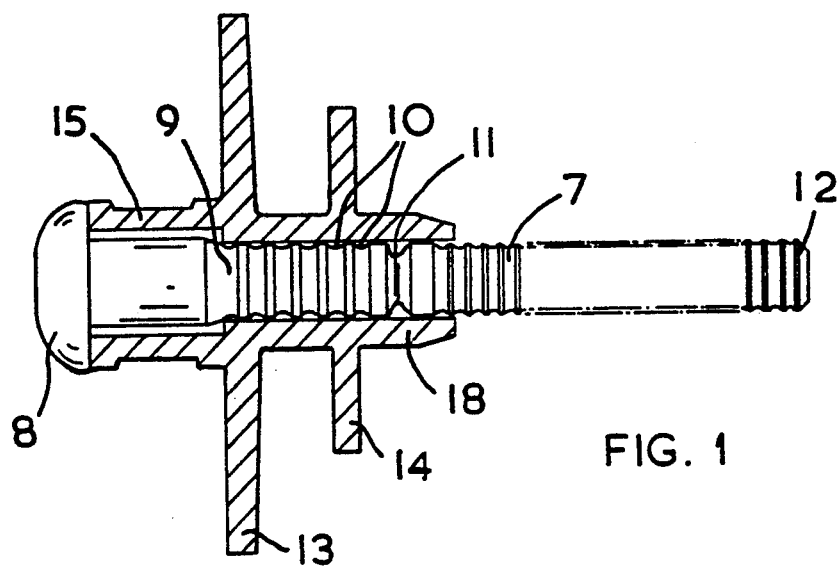
FIG. 1 shows an axial section of a blind pin fixing according to the invention.

In the drawings, a pin usually of steel or aluminium 7 is of the form usually found in blind pin fixings, having a head 8 at the end of stem 9, stem 9 being provided with a series of circumferential grooves 10 axially displaced on stem 9 adjacent head 8. A breakpoint 11 is formed in stem 9 so that end portion 12 of stem 9 is broken off after the fastener is set. A body portion of cast aluminium has a first circular flange 13 spaced from a second circular flange 14. The second circular flange 14 is of smaller diameter than the first circular flange 13. Deformable body portion 15 is of square section and projects from the first flange 13 away from the second flange 14. Four axial slots 16 formed in the deformable body portion 15 extend fully to the end of body portion 15 remote from flange 13 (and flange 14) and so divide it into four sections or 'legs' 17.

In the fastener of FIG. 1, a collar 18 projects from second flange 14 away from the first flange 13.

The blind pin fixing fastener is assembled by inserting the pin 7 through the axial bore of the body portion so that the head 8 of the pin 7 engages deformable body portion 15.

Figure 2:
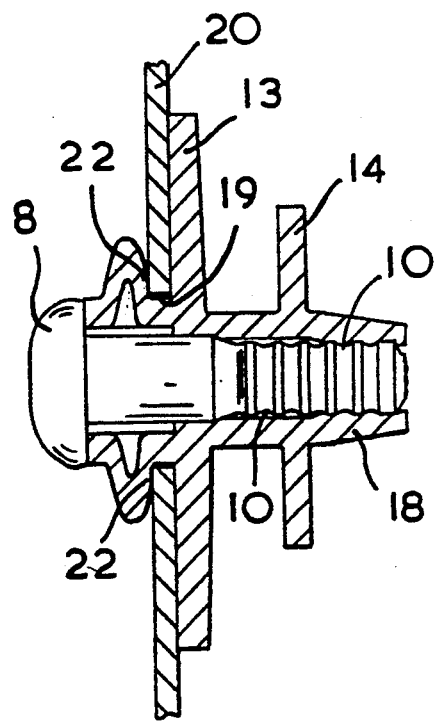
FIG. 2 is an axial section showing the fastener of FIG. 1 set in a hole in a metal sheet.

In use, deformable body portion 15 is inserted into a hole 19 formed in the workpiece to which the fastener is to be attached, shown as sheet 20 in FIG. 2 and as panel 21 in FIG. 6.

To set the fastener of FIG. 1 as shown in FIG. 2, the fastener is held in hole 19 with first flange 13 against sheet 20 and a setting tool applied to locate over the collar 18 as it grips the stem 9 of pin 7 and applies a drawing tension. As the pin is drawn progressively through the body, the deformable body portion 15 collapses and seals hole 19 as shown at 22. In the meantime, the pressure causes the metal of the collar 18 to flow into and fill the grooves 10 in stem 9. The stem 9 then breaks at the breakpoint 11 just within collar 18 and the end portion 12 of stem 9 is discarded.

In the fastener of FIG. 3, a collar 23 only projects a short distance from the second flange 14. Like deformable body portion 15, the collar 23 is also provided with four axial slots 25. The setting of this fastener follows the same procedure. The deformable body portion 15 is inserted into hole 26 in panel 21, which forms part of a car body, with first flange 13 held against panel 21. The setting tool is applied against collar 23 and when drawing tension is applied to stem 9 of pin 7, the 'legs' 17 are spread outwards by the head 8 of pin 7 so as to engage and grip the blind side of the hole 19 in panel 21. When the leg spreading to body grip is complete the sections of collar 23 are caused by the pressure exerted by the nose piece of the setting tool to flow into the groove 10 adjacent the breakpoint 11 so that when the pin breaks at a predetermined load and the end portion 12 is broken off stem 11, it leaves collar 23 set substantially flush with second flange 14.

The slots formed in collar 23 provide segments which serve to reduce the deforming load so that a pin of smaller diameter can be used. The blind pin fixing fasteners according to the invention are thereby made capable of being set by commonly available setting tools which are also very light and manoeuvrable.

Figure 7:
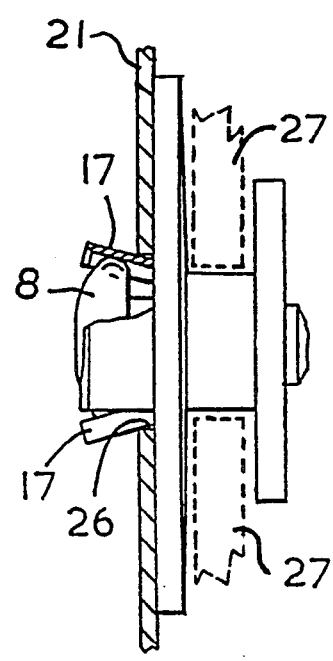
FIG. 7 is a view similar to FIG. 6 and including a schematic illustration of a push-on slotted component.

FIG. 7 schematically illustrates a slotted component 27 accommodated in the space between the two flanges and secured by the blind pin fixing.

I claim:

1. A blind fastener for attachment to an apertured workpiece and for receiving a slotted component to secure the component to the workpiece, said fastener comprising:

a metal pin having a stem and a head;
   said stem having a series of radial grooves therein;
   said stem further having a breakpoint groove at an intermediate location along said stem;

a metal body, said body including:
   a first flange arranged to lie against the apertured workpiece;
   a deformable body portion projecting from one side of said first flange, said body portion comprising a plurality of legs separated by slots therebetween, said portion being adapted to fit into the aperture in the workpiece; and
   a collar projecting from the other side of said first flange, said collar having a second flange thereon spaced from said first flange;

said pin being disposed within said metal body with said head resting against said deformable body portion and said stem extending through said collar, said head being sized to flare said legs of said deformable body portion outwardly to lock said body against the workpiece when said stem is drawn to the point of rupture at said breakpoint groove;

said collar having swageable portions adapted to be swaged into said grooves in said stem below said breakpoint groove as said fastener is being set;

and said collar being adapted to slidably receive a slotted component to retain the slotted component against the workpiece.

2. A blind fastener as claimed in claim 1 wherein said first flange of said metal body is rigid and shaped to lie flush against the apertured workpiece.

3. A blind fastener as claimed in claim 1 wherein said legs of said deformable body portion are adapted to be flared outwardly against the adjacent surface of the workpiece by said head at a force determined by the breakpoint value of said stem.

4. A blind fastener as claimed in claim 1 wherein the spacing between said first and said second flanges is adapted to accommodate a slidably engaged slotted component therein.

* * * * *